Patented Aug. 2, 1932

1,869,660

UNITED STATES PATENT OFFICE

JAMES RAYMOND BUCKLEY, OF PARLIN, NEW JERSEY, ASSIGNOR TO E. I. DU PONT DE NEMOURS & COMPANY, OF WILMINGTON, DELAWARE, A CORPORATION OF DELAWARE

ALKYL ETHER ETHYLENE GLYCOL ESTERS OF FATTY ACIDS

No Drawing.   Application filed December 6, 1930. Serial No. 500,673.

This invention relates to new compositions of matter which are useful as softeners for cellulose compounds. More specifically the invention relates to esters of higher fatty acids and alcohols of the glycol series. Still more specifically the invention relates to the stearic acid ester of the monoethyl ether of ethylene glycol which is more commonly known as cellosolve stearate. The invention further relates to the use of these compositions of matter in coating and plastic compositions.

It has been common practice in the manufacture of coating compositions of the cellulose derivative type to incorporate therein certain high boiling liquids, called softeners and plasticizers, for the purpose of giving flexibility to the finished films. These liquids are substantially non-volatile at ordinary temperatures and consequently remain in the film during the life of the coating. These plasticizers, to be of the greatest utility, should be readily compatible with cellulose compounds, and should produce homogeneous films. Examples of this type of plasticizer are dibutyl phthalate, dibutyl tartrate, tricresyl phosphate, triphenyl phosphate, castor oil, and linseed oil.

Among the objects of this invention are the preparation of new compositions of matter suitable, when used in coating compositions, for producing a film having a high degree of water resistance, and a high degree of flexibility without excess softness or tackiness. Other objects of the invention will be in part apparent and in part set forth hereinafter.

These objects are accomplished by the new compositions of matter described below and by using these new compositions of matter in coating compositions.

In the practice of my invention a higher fatty acid of the saturated series having more than seven carbon atoms (such as caprylic, nonylic, capric, palmitic, margaric, and stearic acids) is reacted with an aliphatic mono ether of a polyhydric alcohol (such as ethylene glycol mono-methyl ether, propylene glycol mono-ethyl ether, butylene glycol mono-propyl ether, diethylene, glycol mono-butyl ether, glycerol mono-ethyl ether). The alcohol used in the reaction may be etherized by the substitution of any alkali group for the hydrogen of a hydroxyl group.

These esters are prepared by any known method of esterification; for instance by heating a charge similar to the following in a still equipped with a dephlegmator and an insulated, glass-bead-filled column:

90 grams cellosolve (mono ethyl ether of ethylene glycol)
284 grams stearic acid
100 grams toluol
0.5 gram sulfuric acid.

In order to carry the reaction to completion it is advantageous to remove the water of esterification as it is formed. This is accomplished by means of the constant boiling azeotropic mixture between toluol and water, which is continuously distilled off to a separate receiver where, on condensation, the water separates and sinks to the bottom while the toluol rises above it. This process is continued until no further water will break from the distillate, or condensate, at which time the esterification is complete. The crude ester can then be heated under a vacuum to remove uncombined cellosolve.

Cellosolve stearate is a liquid at ordinary temperatures, freezes at about 18.5° C., and boils somewhere beyond 325° C. It is miscible with ethyl alcohol, butyl acetate, 62° benzene, ethyl ether, toluene, dibutyl phthalate, and other common solvents. It has an oily feel and is water resistant.

The same process is useful in making the other esters of this series. The variation in properties between the members of this group is not great as the following comparison of four esters of the mono ethyl ether of ethylene glycol shows:—

*Comparative properties of various esters of monoethyl ether of ethylene glycol*

| Test | Stearic acid ester | Oleic acid ester | Palmitic acid ester | Lauric acid ester |
|---|---|---|---|---|
| Inflammability | Burns readily | Burns readily | Burns readily | Burns readily. |
| Refractive index | 1.442 | 1.4515 | 1.441 | 1.4395. |
| Miscibility with lacquer solvents. | Excellent | Excellent | Excellent | Excellent. |
| Miscibility with gum compounds. | Excellent | Excellent | Excellent | Excellent. |
| Solvent power for lacquer type pyroxylin. | Slight solvent alone. Good solvent with alcohol. | Slight solvent alone. Good solvent with alcohol. | Fair solvent alone. Good solvent with alcohol. | Slight solvent action alone. Good solvent with alcohol. |
| Stability toward zinc oxide in white enamel. | Showed graining after 5 days at 65° C. | OK | OK | OK. |

Cellosolve stearate and other esters of this class are useful as plasticizers or softeners in the preparation of coating compositions for use indoors. Their poor moisture resistance renders them relatively unsuited to outdoor exposure. "Softener" and "plasticizer" are herein interchangeably used.

An example of a coating composition containing cellulose nitrate plasticized by cellosolve stearate is as follows:—

|  | Parts by weight |
|---|---|
| Low viscosity nitrocellulose | 8 |
| Cellosolve stearate | 8 |
| Cellosolve | 67 |
| Denatured alcohol | 4 |
| Acetone | 13 |
|  | 100 |

The compositions of this invention may be used to plasticize the other cellulose esters, including cellulose acetate, and the cellulose ethers, such as ethyl and benzyl cellulose.

As many apparently widely different embodiments of this invention may be made without departing from the spirit and scope thereof, it is to be understood that I do not limit myself to the specific embodiments thereof except as defined in the appended claims.

I claim:

1. An ester of a saturated fatty acid having more than seven carbon atoms with the monoethyl ether of ethylene glycol.

2. An ester of stearic acid with the monoethyl ether of ethylene glycol.

3. An ester of a saturated fatty acid having more than seven carbon atoms with a monoalkyl ether of ethylene glycol.

4. An ester of stearic acid with a monoalkyl ether of ethylene glycol.

In testimony whereof, I affix my signature.

JAMES RAYMOND BUCKLEY.

CERTIFICATE OF CORRECTION.

Patent No. 1,869,660. August 2, 1932.

JAMES RAYMOND BUCKLEY.

It is hereby certified that error appears in the printed specification of the above numbered patent requiring correction as follows: Page 1, line 52, for "alkali" read alkyl; and that the said Letters Patent should be read with this correction therein that the same may conform to the record of the case in the Patent Office.

Signed and sealed this 1st day of November, A. D. 1932.

(Seal)

M. J. Moore,
Acting Commissioner of Patents.